J. J. SKEHAN AND J. A. FAUROT.
TELLTALE SIGNAL FOR ROAD VEHICLES.
APPLICATION FILED JAN. 23, 1920.
1,413,361.
Patented Apr. 18, 1922.
2 SHEETS—SHEET 1.
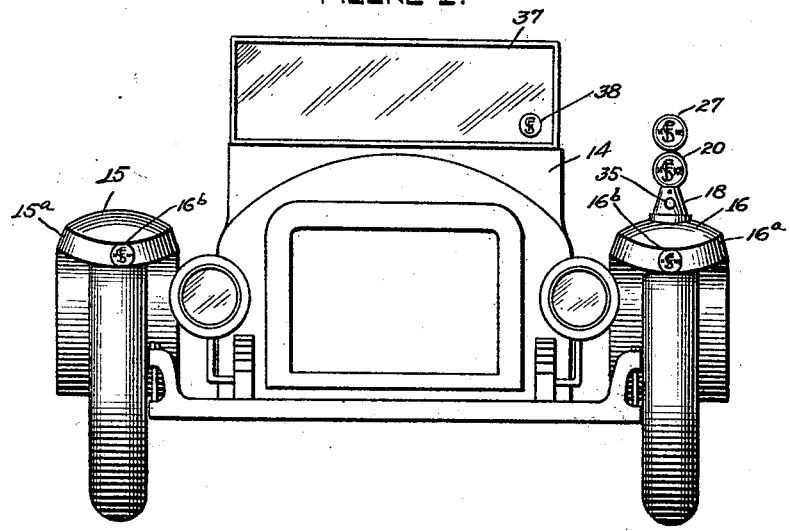
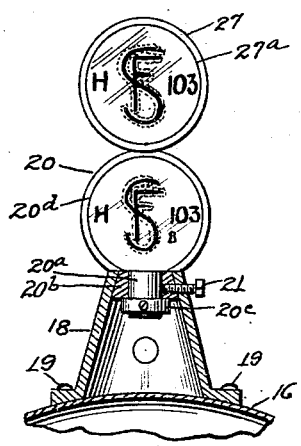 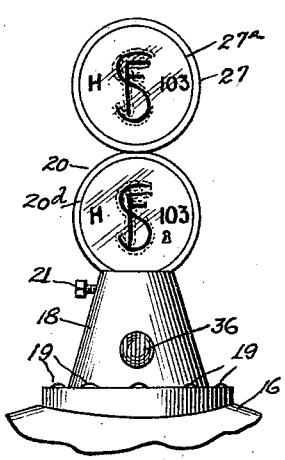 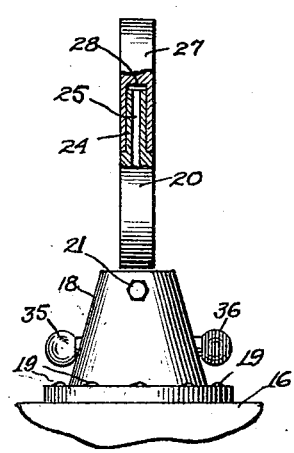
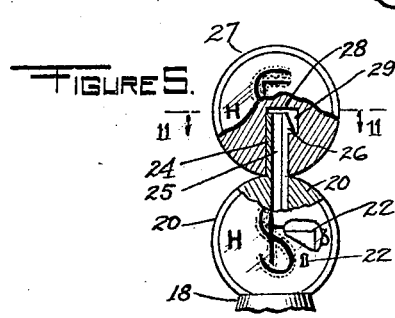
Inventor
JAMES J. SKEHAN
JOSEPH A. FAUROT
By their Attorney
Walton Harrison J. J. SKEHAN AND J. A. FAUROT.
TELLTALE SIGNAL FOR ROAD VEHICLES.
APPLICATION FILED JAN. 23, 1920.
1,413,361.
Patented Apr. 18, 1922.
2 SHEETS—SHEET 2.
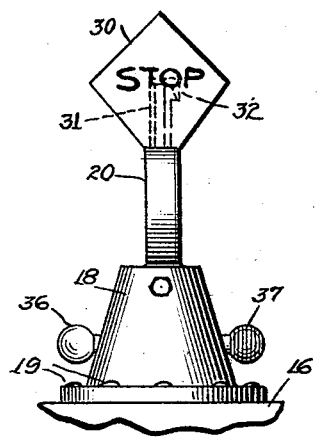
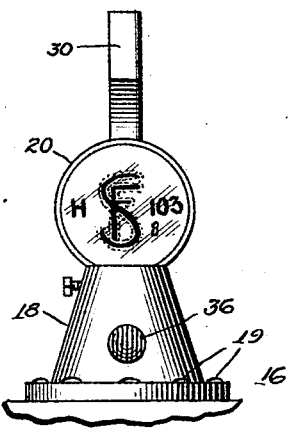
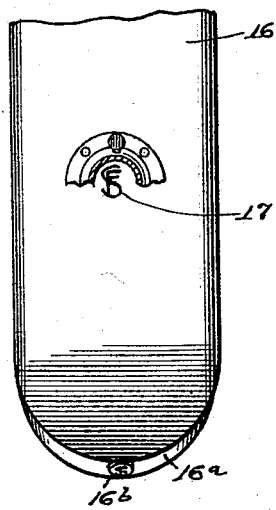
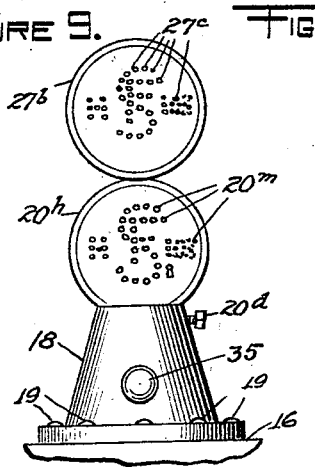
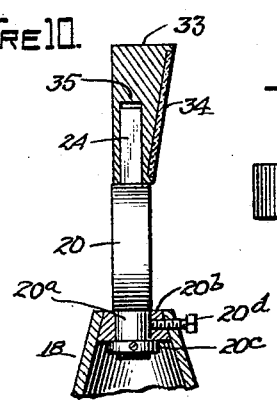
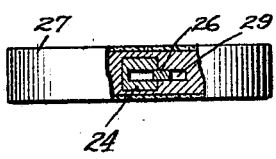
Inventor
JAMES J. SKEHAN
JOSEPH A. FAUROT
By their Attorney
Walton Harrison

UNITED STATES PATENT OFFICE.

JAMES J. SKEHAN AND JOSEPH A. FAUROT, OF NEW YORK, N. Y.

TELLTALE SIGNAL FOR ROAD VEHICLES.

1,413,361.   Specification of Letters Patent.   Patented Apr. 18, 1922.

Application filed January 23, 1920. Serial No. 353,511.

*To all whom it may concern:*

Be it known that we, JAMES J. SKEHAN and JOSEPH A. FAUROT, both citizens of the United States, the former residing in the city of New York, in the county of Bronx and State of New York, and the latter residing in the city of New York, in the county of New York and State of New York, have invented certain new and useful Improvements in Telltale Signals for Road Vehicles, of which the following is a full, clear, and concise description.

Our invention relates to telltale signals for motor vehicles, including automobiles, our primary purpose being to provide the vehicle with visual signals, cheaply constructed and easily operated, for the purpose of assisting police officers, and even bystanders who happen to be on the street, in detecting stolen automobiles or other motor vehicles.

More particularly stated, our invention contemplates the use of visual signal members, preferably small display panels of arbitrary configuration, so arranged under control of the operator as to enable a police officer or other person to ascertain, by a casual glance, whether or not the automobile or other motor vehicle is in the condition in which it should normally be, if under the control of its owner or other person properly having it in his possession.

In addition, our invention contemplates the use of parking lights, so arranged as to be easily seen in connection with the visual signal members above mentioned.

Reference is made to the accompanying drawing forming a part of this specification, and in which like reference characters indicate like parts throughout the several figures.

Figure 1 is a front elevation of an automobile equipped with our invention.

Figure 2 is a view partly in front elevation and partly in section, showing one form of our device, in which certain visual signal members may be seen as they appear when in condition for the vehicle to be driven along the street, under control of its owner or other person having it properly in charge.

Figure 3 is a rear elevation of the mechanism shown in Figure 2.

Figure 4 is a view, partly in side elevation and partly broken away, of the mechanism shown in Figures 2 and 3.

Figure 5 is a view, partly in front elevation and partly broken away, of the mechanism shown in Figures 2 and 3.

Figure 6 is a side elevation showing our visual signal members so selected and arranged as to indicate that the car is unattended by its owner or other person entitled to have it in charge; and consequently to indicate that the automobile is not in proper condition to be driven along the street.

Figure 7 is a rear elevation, otherwise similar to Figure 6.

Figure 8 is a fragmentary plan of a mud guard used in connection with the devices of our invention, and shows certain parts of our construction as partly broken away.

Figure 9 is a front elevation of a form of our device differing slightly from that shown in Figure 2.

Figure 10 is a fragmentary view, partly in side elevation and partly in vertical section, of another form of our device, corresponding to the one shown in Figure 4, but showing the addition of a mirror upon the lower display panel for enabling the chauffeur to watch the road to the rear of the vehicle.

Figure 11 is a section on the line 11—11 of Figure 5, looking in the direction indicated by the arrows.

An automobile is shown at 14, and is provided with a pair of mud-guards 15, 16.

Secured upon the mud guard 16 is a base 18 of frusto-conical form, so located as to normally cover and effectively conceal the indicating mark 17, as shown more particularly in Figure 8. The base 18 is held in position by rivets 19, which extend through the mud guard and are headed up in such manner that the indicating mark 17 is completely hidden, and cannot be brought to view except by removal of the base 18, and consequently by doing a work of spoliation and thus causing the device to act as a telltale.

Mounted permanently upon the base 18 but adjustable relatively thereto is a display panel 20. This display panel is provided with a stem 20ª, which extends downwardly through a bearing 20ᵇ. This bearing has the form of a conoidal ring which is brazed or otherwise secured rigidly within the upper end of the base 18. The stem 20ª carries a collar 20ᶜ, secured rigidly upon it, in order to prevent the stem from being withdrawn from the bearing 20ᵇ. A bolt 21, extending through the wall of the base 18 and through the adjacent portion of the bearing, serves to hold the stem 20ª against rotation, for a purpose hereinafter set forth.

The display panel 20 is of arbitrary configuration—in this instance a flat disk. This disk extends in a plane crossing the general direction of the length of the automobile, and therefore as seen from the front or rear of the vehicle appears to be circular. The display panel, when once mounted and adjusted in position upon the vehicle may be considered as a fixture thereof. It cannot be removed except by leaving the structure in condition to act as a telltale.

Housed within the display panel 20 is a lock 22, provided with a key hole 23. The display panel 20 carries one or more graphic symbols of distinctive appearance, these symbols in this particular instance being a monogram made up of the letters S and F, and also the legend H 103. The legend may indicate the identity of the owner, and the monogram corresponds with the indicating mark 17, as may be understood from Figure 8.

The legend, though preferably embossed, may like the monogram be put on in any other appropriate manner, as by cutting, stamping, printing, labeling, perforating or the like.

The monogram and the legend may be shown in luminous paint or in any of the so-called radium compositions or otherwise self-illuminated, so as to be readily seen in the darkness of night.

Integral with the display panel 20 and extending upwardly therefrom is a neck 24. This neck is provided with a slot 25, and housed within this slot is a bolt 26, having the general form of a hook.

Another display panel 27 has generally speaking the same configuration as the display panel 20, and hence in this particular instance has the form of a disk, so that as seen from the front or from the rear appears to be circular. The display panel 27 is removable, that is, readily detachable from the display panel 20, though by means of the bolt 26, under control of the lock 22, it may for the time being be secured in position so that it can not be removed until the lock 22 is actuated for the purpose.

The display panel 27 is the one which is normally carried upon the display panel 20, while the automobile is being used in active travel along the street, under the control of the owner or other person properly having the machine in charge.

The display panel 27 is provided with a socket 28 having an extension 29, as shown in Figure 5, so that the socket 28 may receive the neck 24, and the extension 29 of the socket can receive the adjacent portion of the bolt 26.

If desired the lock 22 may be left in its idle condition—or in other words the device can be left unlocked, and in such event the bolt 26 is fully withdrawn within the neck, so that the display panel 27 can be removed at the will of any person handling it.

Another display panel 30, having a general appearance quite distinctive from that of the display panel 27, is adapted to be detachably mounted upon the display panel 20, as indicated more particularly in Figures 6 and 7. In this particular instance the display panel 30 is distinguishable from the panel 20 by its form or configuration, it being square and resting upon one corner. Because of its angularity, it is readily discernable by sight. It is flat, and extends in a plane crossing that of the display panel 20. Thus the display panel 30 and the display panel 27 extend in different planes. On this account a police officer or other person, looking at the automobile from a position in front thereof, should see either the angular edge of the display panel 30, or the circular outline of the display panel 27, as the case may be.

The display panel 30 may, if desired, be given an even more distinctive appearance, as for instance, it may be specially colored for the purpose. It can also be rendered self luminous, if this be desired.

The display panel 30 is mounted in position upon the display panel 20 by aid of a socket 31, provided with an extension 32, as indicated by dotted lines in Figure 6. Except as otherwise above specified its structure is like that of the display panel 27.

The purpose of the display panel 30 is to indicate that the car has been left unattended by its owner or other person properly having it in charge, and is therefore not in condition to be driven along the street. Thus any police officer, seeing the display panels 20 and 30 as shown in Figures 6 and 7, would know that the automobile ought to be stationary, and if it be moving along the street he would be justified in making an investigation, or even an arrest.

The display panels 20 and 27 are provided with transparent facings 20ᵈ and 27ª, preferably glass plates, for their protection from dust and various weather conditions, and also for preventing them from being easily tampered with.

In Figure 9 the display panels are shown at 20ʰ and 27ᵇ, and are provided with display characters similar to those above described with reference to Figure 2, but made up of small electric bulbs 20ᵐ, 27ᶜ in order that they may be the more readily seen in the darkness.

In Figure 10 I show another form of display panel at 33, the use of which in a general way corresponds with that of the display panel 27, above described, but which in addition carries a mirror 34, for enabling the chauffeur or other person driving the machine to look to the rear. For this purpose the display panel 33 has such configuration that, as seen from in front of the automobile, it appears to be circular, and otherwise has an appearance like that of the display panel 27 or the display panel 21. Since, however, the display panel 33 carries the mirror 34 and this mirror is tilted to a slight angle as is customary with automobile mirrors, the display panel 33 is formed accordingly, as may be understood from Figure 10.

The display panel 33 is provided with a socket 35, of the same form as the socket 28 or 31 above described and having a similar purpose.

The chauffeur or other person having charge of the motor vehicle can adjust the mirror 34 by adjusting both of the display panels 20 and 33, as a unit. To do this he loosens the bolt $20^d$, turns the display panels until the mirror assumes the position desired, and then tightens the bolt $20^d$.

If the owner or chauffeur of the vehicle leaves the machine unattended, and leaves the display panel 30 in position upon it as indicated in Figures 6 and 7, and a thief or other unauthorized person manages in some way to remove the display panel 30, the mere presence of the display panel 20 without the display panel 30 will show that something is wrong, and thus prompt some police officer to make an investigation and perhaps an arrest.

In instances where parking lamps are used, they may be mounted upon the base 18, as shown in Figures 3, 4, 6 and 7. A bulb lamp 35, white or clear in color, is carried upon the front and a bulb lamp 36, of red color, is carried upon the rear of the base 18.

The operation of our device is as follows:

With the automobile as usually driven along the street, in care of the owner or other person properly having charge of the machine. Visual signals appear as indicated for instance in Figures 1, 2 and 3. Any police officer or other person, watching the vehicle from a position in front of it or to its rear, will see the display panels 27 and 20, and these display panels will appear like two circular bodies substantially alike, one superposed upon the other. This will also be true if the display panel 33, shown in Figure 10 be used instead of the display panel 27 appearing in Figure 2. If, however, the display panel 33 be the one used, the driver or chauffeur of the machine has the advantage of the mirror 34. This mirror is adjustable, as above described.

The driver or owner, in driving the automobile along the street, always keeps the display panels arranged as just stated—that is to say, either the display panel 27 or $27^b$ or 33, according to which of these is used, being superposed upon the display panel 21.

Suppose, next, that the automobile is stopped in front of a store and that the person having it in charge finds it necessary to leave the machine unattended. He takes off the display panel 27 or 33, as the case may be, and puts in its place the display panel 30, preferably locking it in position. If, now, an automobile thief or other person having no authority to disturb the machine comes along and seeks to take possession of the automobile and drive it along the street, he finds it equipped with the display panel 30, the use of which would lead to his arrest. He is therefore, deterred from making any attempt to steal the machine, at least under normal conditions. Should he drive the machine away he is practically sure to be arrested because any police officer happening to notice the display panel 30 would be likely to arrest him, and even any bystander, familiar with the system, could report the matter to the police.

Suppose next that the thief, in order to prevent the display panel 30 from acting as a telltale, should remove the display panel 30, and destroy or hide it. This would leave the stem 24 exposed, and this exposed stem would operate as a telltale and at least indicate that something was wrong. Hence, the thief would probably be arrested, as it would be impracticable for him to drive the automobile very far without giving some police officer or other person good grounds for believing that the automobile was stolen.

The precise configuration of the display panel 20, and consequently that of the companion display panel 27, $27^b$ or 33, can be varied within wide limits, and the expedients which may be adopted in differentiating the equipment of one automobile from that of another are almost innumerable.

We do not limit ourselves to the precise mechanism here shown, the scope of our invention being commensurate with our claims.

We claim—

1. In a tell-tale signal for road vehicles, the combination of an indicating mark placed upon a mud-guard or the like, a supporting base mounted upon said mudguard or the like, and normally concealing said indicating mark, said base being so secured in position that its removal will serve as a tell-tale, and a display panel detachably supported upon said supporting base and provided with graphic symbols related to said indicating mark.

2. In a tell-tale signal for road vehicles, the combination of a mud-guard, a base detachably mounted thereupon, and indicating mark carried by said mud-guard and normally concealed by said base, connections for holding said base upon said mud-guard, so that the removal of said base from said mud-guard in order to expose said indicating mark will operate as a tell-tale, and a display panel detachably mounted upon said base and provided with graphic symbols associated with said indicating mark.

3. In a tell-tale signal for road vehicles the combination, with a supporting member carried by the vehicle, of an indicating mark carried by said supporting member, a supporting base carried by said supporting member and normally concealing said indicating mark, said supporting base being firmly secured to said supporting member so that the removal of said supporting base from said supporting member in order to disclose said indicating mark will operate as a tell-tale, and a display member carried by said supporting base and provided with a graphic symbol related to said indicating mark, said display member serving the purpose of a signal.

4. In a tell-tale for road vehicles, the combination of a supporting base carried by the vehicle, a display member mounted upon said supporting base, and adjustable relatively thereto, means controllable at the will of the operator for holding said display member in different positions of adjustment relative to said base, and a display panel detachably mounted upon said display member and serving the purpose of a signal.

5. A tell-tale for road vehicles comprising a supporting base, means for holding the same upon the vehicle, a display panel carried by said supporting base, and provided with a legend so as to serve as a signal, and a plurality of other display panels distinctive in appearance each from the other, each of said second-mentioned panels being provided with means for enabling it to be detachably mounted upon said first-mentioned display panel, so that said first-mentioned panel and some one of said second-mentioned panels may both be readily seen at the same time.

6. A tell-tale for road vehicles comprising a supporting base, a display panel mounted upon said supporting base, and having a distinctive appearance facilitating it to act as a visual signal, a pair of other display panels distinctive in appearance each from the other, so as to be capable of use severally as distinct signals, and means controllable at the will of the operator, for securing either one of said second-mentioned panels upon said first-mentioned panel.

JAMES J. SKEHAN.
JOSEPH A. FAUROT.